May 11, 1937.  G. E. NERNEY  2,079,964
EYEGLASS CONSTRUCTION
Filed Oct. 22, 1934
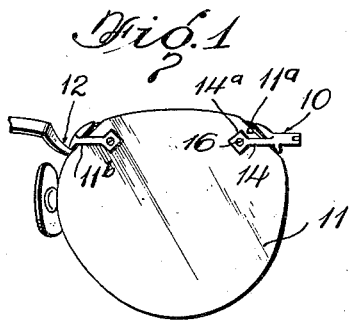
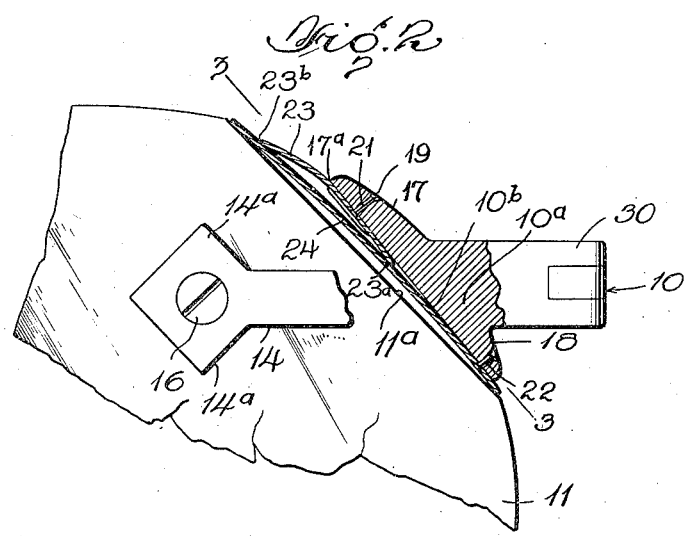
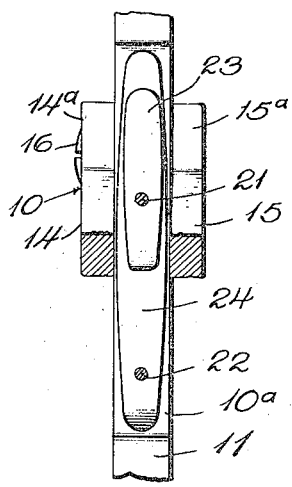
INVENTOR
G. E. Nerney.
BY
ATTORNEYS Patented May 11, 1937

2,079,964

UNITED STATES PATENT OFFICE 2,079,964

EYEGLASS CONSTRUCTION

George E. Nerney, Attleboro, Mass., assignor to Bay State Optical Company, Attleboro, Mass., a corporation of Maine Application October 22, 1934, Serial No. 749,442

3 Claims. (Cl. 88—47)

This invention relates to an eyeglass construction.

One of the objects of this invention is to provide a lens connecting construction for rimless frames or the like which is strong, durable and thoroughly practical. Another object is to provide a construction of the above nature which is well adapted to withstand continuous hard use. Another object is to provide a construction of the above nature which may be rapidly and easily manufactured with a minimum amount of labor, and with inexpensive materials. Another object is to provide a construction of the above nature wherein the assembly of the endpieces to their respective lenses can be maintained without danger of fracturing the lenses. Another object is to provide a construction of the above nature wherein the lens connecting parts may be fitted into the desired position with ease and in which small inaccuracies in the positioning of the holes in the lens may be automatically compensated for. Another object is to provide an endpiece construction for eyeglasses which enhance the appearance of frames of this general character. Another object is to provide a construction of the above nature which is well suited for use on frames wherein the endpieces are secured to the lenses at points spaced above the transverse axes thereof. Other objects will be in part obvious and in part pointed out hereinafter.

The invention accordingly consists in the features of construction, combinations of elements, and arrangements of parts as will be exemplified in the structure to be hereinafter described and the scope of the application of which will be indicated in the appended claims.

In the accompanying drawing, in which is shown one of the various possible embodiments of my invention, Figure 1 is a front elevation of an eyeglass lens having my endpiece and bridge connections mounted thereon;

Figure 2 is an enlarged fragmentary elevation of an eyeglass lens having my endpiece mounted thereon, certain parts of the endpiece being broken way; and Figure 3 is a sectional view taken along the line 3—3 of Figure 2.

Similar reference characters refer to similar parts throughout the several views of the drawing.

In order that certain features of this invention may be better understood, it might here be pointed out that various difficulties have been encountered in attempting to achieve a reliable and durable connection between a fitting, such as an endpiece, and a lens. This is particularly true in rimless frames which are decidedly more fragile than other types of frames, and in which the lenses have not the usual benefits to be derived from rim support. Such fittings are usually secured to the lenses by way of arms extending over the opposite surfaces of the lenses, having a screw or the like passing therethrough and through the lenses. After continued use, this connection between the screw and the arms often becomes loose thus allowing for some pivotal movement of the fitting about the screw. If then the fitting is subjected to unusual strains such as are often possible, for example, by twisting the temples, it has a tendency to pivot about the screw allowing the rigid arms in alinement with the edge of the lens to dig into the lens, chipping it and often causing breakage. Further still such pivotal movement under stress often causes the portion of the lens between the screw hole and the edge to break out necessitating replacement of the lens. Also, the assembly of such frames is extremely difficult. The screw hole must be located in the lens with extreme accuracy otherwise it will not be in alinement with the holes in the inwardly extending arms of the fitting or will be too close to the edge of the lens thus spacing the body portion of the fitting from the edge to make a loose and sloppy connection. One of the objects of this invention is to provide a construction in which the above-mentioned difficulties as well as many others are successfully overcome.

Referring now to the drawing in detail, there is shown in Figures 1 and 2 a lens 11 preferably characterized by the shape of its edge and more particularly the top portion 11a thereof which is preferably regular and slants upwardly and inwardly substantially in a direction toward the nose of the wearer. Lens 11 likewise has another straight edge portion 11b (Figure 1) which slants upwardly and outwardly away from the nose of the wearer, the lens thus desirably taking the form shown in Figure 1.

Secured to lens 11 substantially adjacent edge portion 11a thereof is an endpiece fitting generally indicated at 10, while a bridge fitting generally indicated at 12 is secured to the lens substantially adjacent edge portion 11b thereof. As the lens-connecting portions of fittings 10 and 12 are substantially similar, the details of construction with respect to fitting 10 will only be described.

Referring now to Figure 3, fitting 10 includes a pair of arms 14 and 15 which are preferably integral with body portion 10a (Figure 2) of endpiece 30. Arms 14 and 15 extend inwardly over the opposite surfaces of lens 11 and terminate at enlarged portions 14a and 15a, these arms preferably being parallel to the transverse axis of the lens. Portions 14a and 15a are suitably bored for the reception of a pin or screw 16 which extends through both of these portions and lens 11 to secure fitting 10 in position on the lens. Screw 16 is preferably threaded into the bore of portion 15a and accordingly upon being taken up, arms 14 and 15 lie flush against the opposite surfaces of lens 11 preferably in substantially the position shown in Figure 1.

The inner surface 10b (Figure 2) of body portion 10a which lies between arms 14 and 15 is substantially parallel to the edge portion 11a and is also substantially in alinement therewith. Extending upwardly and downwardly from body portion 10a is a pair of substantially rigid lens straps 17 and 18 which are preferably integral with body portion 10a and in alinement with edge portion 11a; the inner surfaces of these straps are substantially parallel to edge portion 11a and are preferably in the same plane as face 10b of the body portion.

Referring more particularly to Figure 2, when fitting 10 is in its normal position, arms 14 and 15 are substantially parallel to the transverse axis of the lens, and, as explained above, surface 10b of the fitting and the inner surfaces of straps 17 and 18 are substantially parallel to edge portion 11a. Furthermore when the fitting is in its assembled position, strap 17 terminates below a line A passing through the axis of screw 16 and perpendicular to edge portion 11a. Accordingly if the fitting is pivoted in a counter-clockwise direction, as viewed in Figure 2, end portion 17a of strap 17 moves away from edge portion 11a of the lens, i. e., the space between end portion 17a and the edge of the lens is increased. On the other hand, clockwise movement of the fitting about screw 16 decreases any space which may exist between strap 18 and edge portion 11a to bring the inner surface of this strap into a glancing engagement with the edge. This glancing engagement of strap 18 with the edge of the lens is not damaging as no part of the strap can bite into the edge due to the shape of the parts.

Preferably secured to strap 18 is a spring leaf 24 extending upwardly between arms 14 and 15 (Figure 3), beneath strap 17, and terminating at a point substantially above end portion 17a of strap 17. Preferably spring leaf 24 is secured to strap 18 by way of a rivet 22 or the like. A spring leaf 23 is preferably secured to strap 17 by way of a rivet 21 or the like extending therethrough. Preferably the intermediate portion of spring leaf 23 is secured to the strap leaving the free ends thereof to engage spring leaf 24. Thus end portion 23a of spring leaf 23 desirably engages spring leaf 24 in the vicinity of the body portion of the fitting while the upper end portion 23b contacts spring leaf 24 at a point substantially spaced from end portion 17a of strap 17.

Accordingly it will now be seen that spring leaf 23 cushions end portion 17a against spring leaf 24, while spring leaf 24 cushions the entire fitting against edge portion 11a of the lens. All rigid portions of fitting 10 are out of engagement with the edge of the lens, the only contact between the fitting and the edge being achieved by spring leaf 24. Furthermore, as explained above, any pivotal movement of the fitting in a clockwise direction as viewed in Figure 2 is converted into a glancing force against edge portion 11a and consequently cannot damage the edge. The upper portion of the fitting, i. e. that portion in the vicinity of strap 17, is amply cushioned from the edge of the lens by the spring leaves 23 and 24.

If for any reason, as, for example, the loosening of screw 16, it becomes possible for fitting 10 to pivot slightly about the screw as an axis, such pivotal movement in a clockwise direction as viewed in Figure 2 is a practical impossibility due to the proximity of strap 18 to edge portion 11a. Pivotal movement of the fitting in a counter-clockwise direction first causes end portion 17a to move away from edge 11a as described above, tending to release the tension in the springs and accordingly lessen the strains on the connection between the lens and the endpiece. However, this does not make for a sloppy connection between the fitting and the edge of the lens as spring leaves 23 and 24 take up the slack as it develops. If, for any reason, this pivotal movement continues, end portion 17a of strap 17 presses against spring 23 and in turn against spring 24. However the end portion is amply cushioned from the edge of the lens consequently avoiding any chipping of the edge as might be true in many of the constructions now in use. Further still, during this pivotal movement or the application of a force tending to cause pivotal movement, there is no rigid part in engagement with the edge of the lens and consequently the forces tending to pull screw 16 toward the edge of the lens to break out this portion of the lens are reduced. These forces are reduced to the amount of tension existing in springs 23 and 24 which is not sufficient to break out this portion of the lens.

When a fitting of this character is to be applied to a lens it is first necessary to bore a hole through which screw 16 fits. If this hole is inadvertently placed too close to portion 11a of the lens, the slack between the body of the fitting and the edge of the lens is taken up by the spring leaves 23 and 24. If, on the other hand, the hole is placed further away from the edge, the spring leaves may be flattened down more so that the screw may be passed therethrough. It will thus be seen that considerable leeway is allowed in locating the hole, thus making the assembly much more simple than has been true in past constructions.

Accordingly it will be seen that I have provided an efficient and thoroughly practical construction in which the several objects hereinabove set forth in addition to many others have been successfully accomplished.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:
1. In eyeglass construction, in combination, a lens having a straight edge portion at a substantially acute angle to the transverse axis thereof and inclined inwardly toward the vertical axis of said lens, a fitting mounted on said lens and capable of pivoting about a point on said lens under stress, a strap extending upwardly from said fitting substantially in alinement with said edge portion, the free end of said strap being spaced below a line perpendicular to said edge portion and extending through the pivotal axis of said fitting, a spring member disposed between said strap and said edge portion and secured to said fitting, and resilient means disposed between one end of said strap and said spring member and secured to said strap at a point spaced from the point at which said spring member is secured to said fitting.

2. In eyeglass construction, in combination, a lens having a straight edge acutely inclined with respect to the transverse axis thereof in a direction toward the vertical axis thereof, an endpiece including a body portion and a pair of spaced arms extending integrally therefrom, said arms embracing opposite surfaces of the lens and being pivotally secured thereto at a point spaced above the transverse axis of said lens, the surface of said body portion adjacent said straight edge being in substantial alinement with said straight edge and the top surface of said body portion being substantially parallel to the transverse axis of said lens, a pair of straps integral with said body portion and extending upwardly and downwardly therefrom respectively in alinement with said straight edge, a spring part secured at one end to said downwardly extending strap and disposed between said endpiece and said straight edge and contacting said straight edge at both ends thereof, and a spring member disposed between said upwardly extending strap and said spring part, both ends of said spring member contacting the outer surface of said spring part, the free end of said upwardly extending strap being spaced below a line perpendicular to said straight edge and passing through the pivotal axis of said arms.

3. In eyeglass construction, in combination, a lens having a straight edged portion, a fitting pivotally secured to said lens, a pair of arms one extending upwardly and the other extending downwardly from said fitting adjacent the edge of said lens and substantially in alignment therewith, a spring part longer than and disposed between said arms and the edge of said lens, said spring part extending beyond the ends of said arms, both ends of said spring part engaging said straight edged portion, said spring part being secured to said downwardly extending arm, and a spring member substantially shorter than said spring part and disposed between said upwardly extending arm and said spring part, the opposite ends of said spring member engaging said spring part only at points spaced from the lower edge thereof and being secured to said upwardly extending arm.

GEORGE E. NERNEY.